United States Patent [19]

Storer

[11] Patent Number: 5,695,228
[45] Date of Patent: Dec. 9, 1997

[54] GRILLE GUARD FOR AN AUTOMOTIVE VEHICLE

[76] Inventor: Ron D. Storer, 3015 San Juan Dr., Fullerton, Calif. 92635

[21] Appl. No.: 654,738

[22] Filed: May 29, 1996

[51] Int. Cl.$^6$ ................................................ B60R 19/52
[52] U.S. Cl. ......................... 293/115; 29/460; 29/DIG. 48
[58] Field of Search ................................. 293/115, 155; 296/29; 403/11; 248/225.11, 916; 29/460, 897.3, 897.35, DIG. 48; 228/165, 174

[56] References Cited

U.S. PATENT DOCUMENTS

| | | | |
|---|---|---|---|
| 1,037,122 | 8/1912 | Buffinger et al. | |
| 1,688,950 | 10/1928 | Wait | 29/897.35 |
| 1,911,413 | 5/1933 | Wait | |
| 2,844,864 | 7/1958 | Schliberg | 29/155 |
| 3,470,598 | 10/1969 | Berthelsen | 29/155 |
| 4,964,256 | 10/1990 | McCracken | 52/726 |

FOREIGN PATENT DOCUMENTS

| | | | |
|---|---|---|---|
| 1524296 | 5/1968 | France | 248/225.11 |
| 1452956 | 6/1969 | Germany | 29/897.35 |

OTHER PUBLICATIONS

Go Rhino! Catalog 960; 8 pages.

Primary Examiner—David M. Mitchell
Assistant Examiner—Jonathan J. Yun
Attorney, Agent, or Firm—Stetina Brunda Garred & Brucker

[57] ABSTRACT

A grille guard for an automobile has at least one first grille guard member extending generally horizontally so as to protect a portion of an automobile's front and at least one second grille guard member extending generally vertically and attached to the first grille guard member. Each of the second grille guard members has a first generally planar member and a perpendicular second generally planar member generally defining a T-shaped cross-section. The second generally planar member has a plurality of openings formed therein, generally along the length thereof, the openings having a width which is greater than the width of the first generally planar member. The second generally planar member is attached to the first generally planar member by forming a weld between the second generally planar member and the first generally planar member within a plurality of the openings. The first and second generally planar members are thus attached to one another in a manner which mitigates the formation of corrosion in blind corners at the interface of the first and second generally planar members.

10 Claims, 2 Drawing Sheets

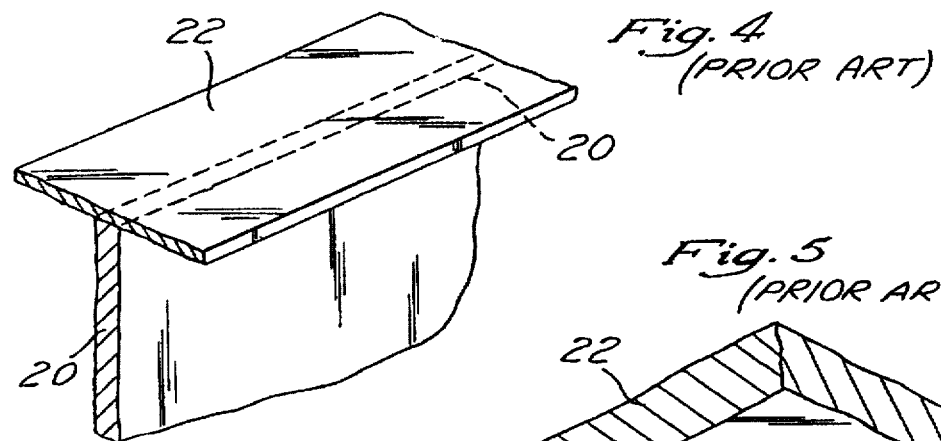
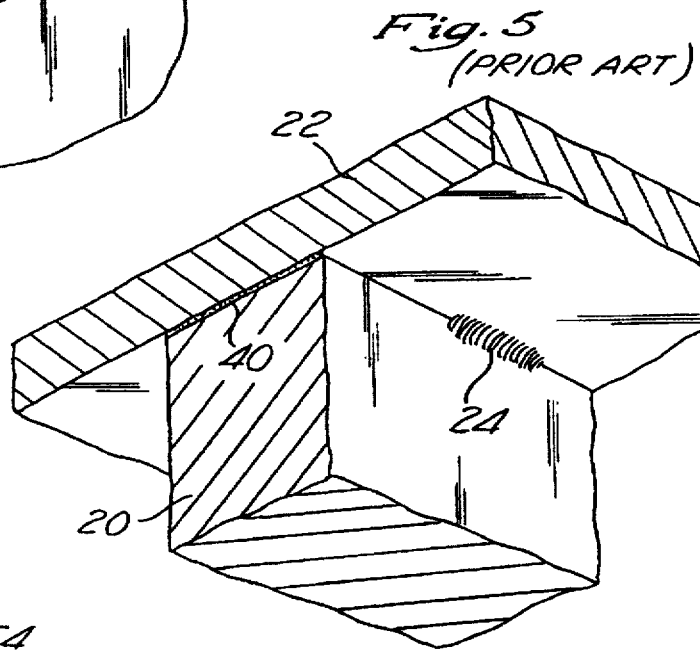
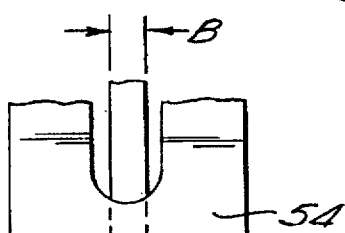
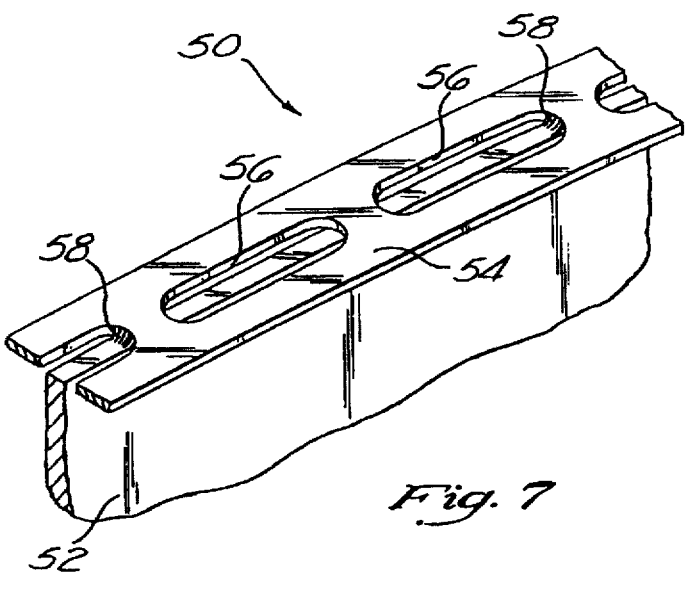

5,695,228

GRILLE GUARD FOR AN AUTOMOTIVE VEHICLE

FIELD OF THE INVENTION

The present invention relates generally to automotive accessories for enhancing the styling and functionality of trucks and sport utility vehicles, and more particularly to a grille guard for trucks and sport utility vehicles, wherein the grille guard comprises a bracket for facilitating the attachment of a resilient outer covering thereto. According to the present invention, the formation of blind corners at the bracket is mitigated so as to enhance the application of a surface finish thereto, and thereby inhibit the formation of corrosion, proximate the bracket.

BACKGROUND OF THE INVENTION

Grille guards, brush guards, and the like for protecting the front end of trucks, sport utility vehicles, and other automobiles are well known. Such grille and brush guards are commonly mounted to the front ends of such vehicles so as to prevent damage thereto during off road use. During off road use such vehicles are subject to damage caused by rocks, tree limbs and other such matter which is typically present in the outdoors.

Further, grille and brush guards provide an aesthetic appearance which appeals to many vehicle owners. Thus, grille and brush guards are frequently mounted to an automobile whether or not off road use is contemplated.

As those skilled in the art will appreciate. Such grille and brush guards typically comprise a plurality of horizontally extending, typically tubular members which generally cover the grille and headlights of the automobile. Typically, two vertical members extend downwardly from the horizontal members to facilitate more rigid attachment of the horizontal members to the automobile and also to facilitate the attachment of various accessories thereto. Such accessories typically comprise winches, winch hooks, resilient members or rubber bumpers, license plate holders, etc. The vertical members typically comprise sheet metal or plate, commonly having a right angle bend or L-shape formed therein for strength.

Such rubber bumpers are typically attached to the vertical members of the grille and brush guard by various means, i.e., fasteners, adhesive bonding, etc.

One contemporary method for attaching such rubber bumpers to the vertical members of a grille and brush guard is to form the vertical members of two separate pieces of sheet metal or plate, attached to one another in a manner so as to form a T-shaped cross-section, thereby defining a track along the forward edge of the vertical members upon which an extruded rubber bumper having a channel complimentary to the track can slide. Such construction eliminates the requirement for mounting hardware and/or adhesive. Such construction therefore desirably reduces the materials and assembly costs. As such, attachment of the rubber bumper to the vertical members of a grille and brush guard via the use of such tracks and channels is preferred. The T-shaped vertical members thus do not require the use of fasteners, adhesive bonding, etc., in order to facilitate the attachment of rubber bumpers thereto, as do the L-shaped vertical members discussed above.

In order to form the T-shaped configuration of the vertical members, a comparatively thin strip of sheet metal is typically welded to a thicker plate of metal. The thicker plate of metal provides the structural strength for the vertical member while the thinner strip of sheet metal defines the track upon which the rubber bumper is attached.

However, forming the track in such a manner inherently causes the formation of blind corners which are subject to undesirable corrosion. Blind corners are formed at the interface of the thin strip of sheet metal and the thicker plate of metal, where they are attached to one another. As those skilled in the art will appreciate, at this interface it is difficult to properly and adequately apply protective surface finishes in order to inhibit corrosion.

Thus, when the vertical member is being chrome plated, powder coated, or painted, such surface finishes do not adequately cover the metal at the blind corner, i.e., where the two pieces of metal abut. Since the metal surface at the blind corner is not adequately protected from corrosion, corrosion inevitably occurs at this location and then begins to propagate outwardly therefrom. As the corrosion propagates away from the blind corner, visible discoloration is apparent. The corrosion commonly causes surface finishes such as chrome plating and powder coating to rust or peel off. Further, over extended periods of time, the structure is substantially weakened by such corrosion.

As such, it is desirable to find means for attaching sheet metal to metal plate, so as to define a T-shaped configuration suitable for the attachment of a rubber bumper without the use of adhesive as fasteners, which minimizes the occurrence of blind corners so as to mitigate the formation of undesirable corrosion.

SUMMARY OF THE INVENTION

The present invention specifically addresses and alleviates the above-mentioned deficiencies associated with the prior art. More particularly, the present invention comprises a grille guard for an automobile, the grille guard comprising at least one first grille guard member extending generally horizontally, so as to protect a portion of an automobile's front. At least one second grille guard member extends generally vertically and is attached to the first grille guard member(s).

Each of the second grille guard members comprises a first generally planar member oriented so as to define a plane which extends generally longitudinally with respect to the automobile and a second generally planar member oriented to define a plane which extends generally transversely with respect to the automobile. Thus, the first and second generally planar members define a T-shaped cross-section.

The second generally planar member comprises a plurality of openings formed therein, generally along the entire length thereof. The openings preferably have a width which is greater than the width of the first generally planar member.

The second generally planar member is attached to the first generally planar member by forming a weld between the second generally planar member and the first generally planar member within a plurality of the openings of the second generally planar member.

The welds attach the second generally planar member to the first generally planar member in a manner which provides a generally flush finish to a front surface of the second generally planar member, so as not to interfere with the attachment of the rubber bumper thereto.

Such attachment of the second generally planar member to the first generally planar member mitigates the formation of blind corners, thereby facilitating the application of protective surface finishes thereto and consequently inhibiting the formation of corrosion. The application of protective surface finishes to the first and second generally planar members, particularly proximate the interface thereof, is enhanced since these surfaces are more exposed according to the present invention.

The grille guard preferably comprises a plurality of generally horizontal first grille guard members. The grille guard preferably comprises two vertically extending second grille guard members.

The first generally planar member preferably comprises metal plate having a thickness of between approximately 0.150 inch and 0.500 inch, preferably approximately 0.250 inch, and the second generally planar member preferably comprises sheet metal having a thickness of between approximately 0.025 inch and 0.250 inch, preferably approximately 0.050 inch.

The openings formed in the second generally planar member preferably have a length of between approximately 0.25 inch and 3.00 inch, preferably approximately 1.50 inch, and the spacing between the openings preferably has a length of between approximately 0.10 inch and 2.00 inch, approximately 0.25 inch.

The openings formed in the second generally planar member preferably have a width of between approximately 0.20 inch and 0.75 inch, preferably approximately 0.375 inch. The openings preferably have a width greater than the thickness of the first generally planar member and are preferably centered approximately over the first planar member such that finishing can be easily applied to substantially all surfaces of the first and second planar members. Thus, the openings allow the substances utilized in the surfacing processes to flow to substantially all parts of the surface of the first generally planar member and the second generally planar member, so as to assure adequate finishing thereof.

According to the preferred embodiment of the present invention, the second generally planar member is attached to the first generally planar member via welds formed within every other opening of the second generally planar member. Those skilled in the art will appreciate that various other welding configurations are likewise suitable. For example, multiple welds may be formed within each opening, or within every other opening, every third opening, every fourth opening, etc. Alternatively, a single weld may be formed in each opening, every other opening, every third opening, every fourth opening, etc.

By providing the openings in the second generally planar member, adequate chrome plating, powder coating, painting, etc. of the first and second generally planar members is assured. Such desired finishing of the first and second generally planar members mitigates the formation of undesirable corrosion which would otherwise spoil the aesthetic features thereof and/or reduce the structural strength thereof.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 4 is a cross-sectional fragmentary front perspective of the generally planar vertical members of FIG. 3 showing the abutment or interface of the two generally planar members in dashed lines;

FIG. 5 is an enlarged cross-sectional fragmentary perspective view better showing the interface of the two generally planar members of FIG. 3;

FIG. 6 is a fragmentary top view showing attachment of the sheet metal generally planar vertical member to the plate generally planar vertical member via welds within the openings of the sheet metal generally planar vertical member; and FIG. 7 is a fragmentary perspective view showing attachment of the sheet metal generally planar vertical member to the plate generally planar vertical member via welds within the openings of the sheet metal generally planar vertical member

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The grille and brush guard of the present invention is shown in FIGS. 6 and 7 of the drawings, which depict a presently preferred embodiment thereof. FIGS. 1–5 depict prior art vertical members.

Figure 1:
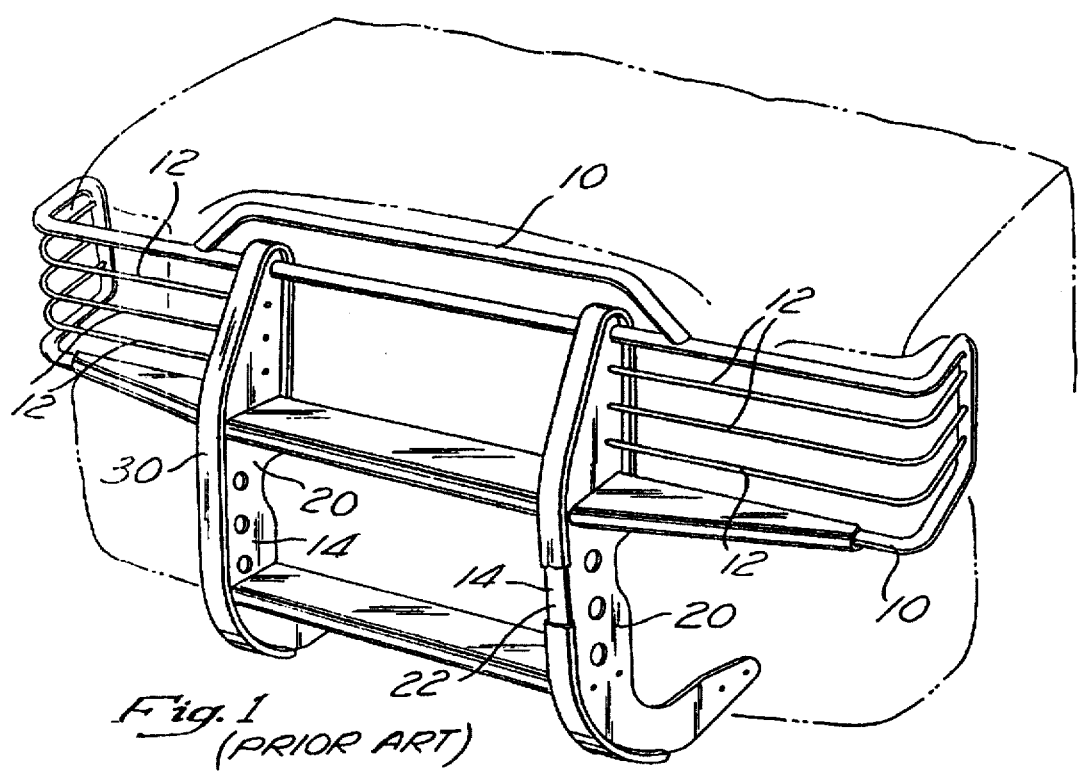
FIG. 1 is a front perspective view of a grille and brush guard showing vertical members thereof according to the prior art.

Referring now to FIG. 1, the prior art grille and brush guard generally comprises a plurality of generally horizontal tubular members 10 and, optionally, a plurality of smaller generally horizontal bar members 12. The horizontal tubular members 10 are preferably comprised of tubular metal and the smaller horizontal bar members 12 are preferably comprised of solid heavy gauge metal wire.

Depending downwardly from and attached to the generally horizontal members 10 and 12 are two generally vertical members 14. The generally vertical members 14 comprise first 20 and second 22 generally planar vertical members. This T-shaped configuration of the two vertical members 14 is common to both the prior art and the present invention.

Figure 2:
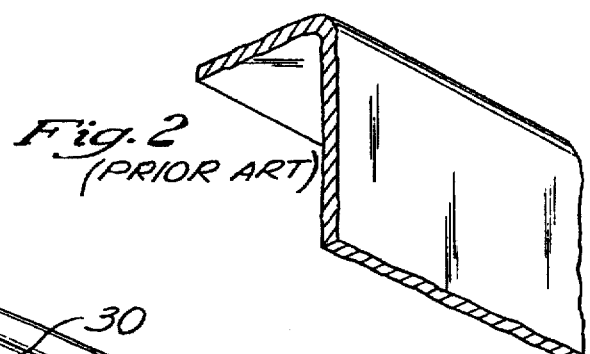
FIG. 2 is a cross-sectional fragmentary perspective view of a prior art vertical member showing the L-shaped cross-sectional configuration thereof.

Referring now to FIG. 2, according to the prior art, the vertical members are alternatively generally configured as L-shaped members. As discussed above, it is frequently desirable to install rubber bumpers upon the vertical members, so as to enhance the aesthetic appeal thereof and also so as to provide a degree of protection thereto. Although such rubber bumpers can be attached to vertical members configured to have such a L-shape, such attachment must be accomplished via fasteners, adhesive bonding, or the like. The L-shaped configuration does not lend itself to the installation of a rubber bumper having a track formed therein such that the rubber bumper may simply be slid thereover. As such the T-shaped configuration of FIGS. 1, 3-5 is the preferred configuration for the vertical members 14.

Figure 3:
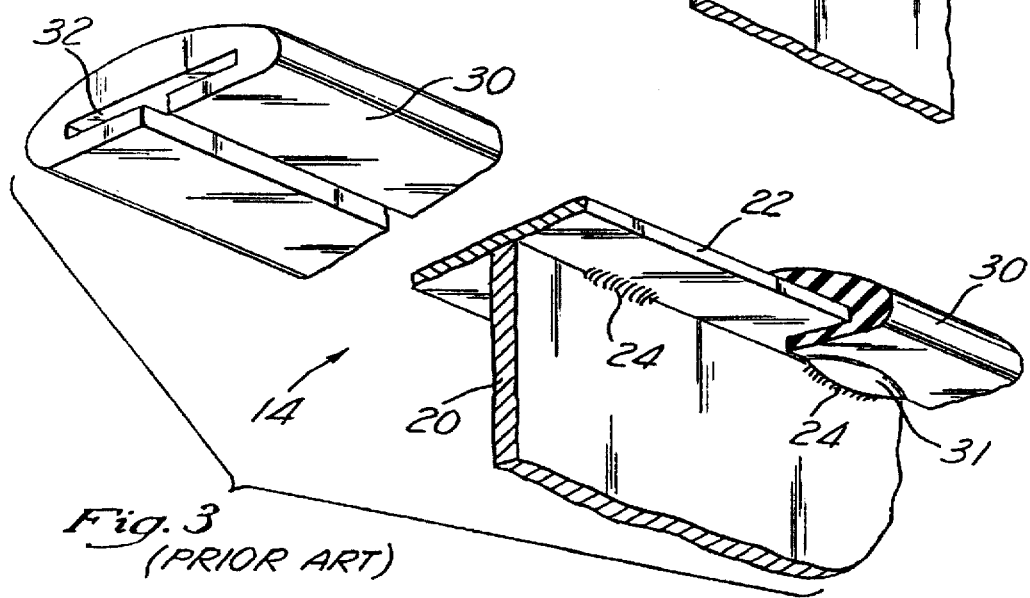
FIG. 3 is a cross-sectional fragmentary rear perspective view showing the T-shaped configuration of the prior art, showing a rubber bumper positioned to be slid thereover, and also showing the welds attaching the second generally planar member to the first generally planar member thereof.

Referring now to FIGS. 3 and 4, as mentioned above the vertical members 14 of the prior art comprise a first generally planar member 20 to which is attached a second generally planar member 22, so as to form a T-shaped configuration suitable for the attachment of rubber bumper 30 thereto by simply sliding the rubber bumper 30 thereover such that the second generally planar member 22 is received within a channel 32 formed within the rubber bumper 30. According to prior art methodology, welds 24 attach the second generally planar member 22 to the first generally planar member 20.

A rubber bumper 30 having such a configuration, i.e., an internal channel, is inexpensive to manufacture, since it may readily be extruded in the desired shape. Also, installation of such a rubber bumper 30 is comparatively easy and inexpensive, since it is merely slid over the second generally planar member 22 and the use of adhesive and/or fasteners are not required. As such, the use of such a slide-on rubber bumper 30 is preferred.

As will be appreciated by those skilled in the art, although the T-shaped configuration of FIG. 3 does facilitate the easy installation of the rubber bumper 30 thereupon, it also suffers from the inherent disadvantage of being particularly susceptible to corrosion.

Further, the welds 24 cause undesirable bowing 31 in the rubber bumper 30 and are typically at least partially visible even when the rubber bumper 30 is installed upon the second generally planar member 22.

Referring now to FIG. 5, such corrosion 40 occurs since a blind corner is formed at the interface of the first generally planar vertical member 20 and the second generally planar vertical member 22. As those skilled in the art will appreciate, when a protective finish, e.g., chrome plating, powder finishing, painting, etc., is applied to the welded first 20 and second 22 generally planar vertical members, the surfaces at the interface thereof are not generally adequately covered by the protective finish. It is extremely difficult, if not impossible to sufficiently apply a surface finish to the first and second generally planar vertical members 20 and 22, so as to adequately inhibit corrosion.

Thus, such blind corners are particularly susceptible to corrosion 40. Once initiated, such corrosion 40 tends to propagate beyond the blind corner, thus affecting the nearby surfaces. Such propagation of the corrosion 40 is aesthetically undesirable, and also, over time, reduces the structural strength of the members.

Referring now to FIG. 6, a vertical member 50 according to the present invention is shown. Vertical member 50 corresponds to the vertical member 14 of the prior art. The vertical member 50 comprises first generally planar vertical member 52 and second generally planar vertical member 54 attached substantially perpendicularly thereto. The first generally planar vertical member 52 preferably comprises metal plate, preferably steel, having a thickness (Dimension B) of between approximately 0.150 inch and 0.500 inch, preferably approximately 0.250 inch. The second generally planar vertical member 54 preferably comprises sheet metal, preferably steel, preferably having a thickness of between approximately 0.025 inch and 0.250 inch, preferably approximately 0.050 inch. The first generally planar member 52 of the present invention corresponds to the first generally planar member 20 of the prior art. Likewise, the second generally planar member 54 of the present invention corresponds to the second generally planar member 22 of the prior art. Thus the rubber bumper (such as 30 of FIG. 3) slides over the second generally planar member 54 of the present invention.

A plurality of elongate openings 56 are formed, preferably along the entire length of the second generally planar vertical member 54. The openings 56 preferably have a length (Dimension D) of approximately between 0.25 inch and 3.00 inch, preferably approximately 1.50 inch and have a spacing (Dimension C) therebetween which is preferably between 0.10 and 2.00 inch, preferably approximately 0.25 inch.

The elongate openings 56 formed in the second generally planar vertical member 54 have a greater width than the thickness of the first generally planar vertical member 52 such that a surface finish will adequately cover a substantial portion of the abutting edge of the first generally planar vertical member 52. The elongate openings 56 preferably have a width (Dimension A) of between approximately 0.20 inch and 0.75 inch, preferably approximately 0.375 inch. The width (Dimension A) of the openings is preferably greater than the thickness (Dimension B) of the first generally planar vertical member.

In this manner, the blind corners associated with prior art construction, as illustrated in FIGS. 3-5, is substantially eliminated, thereby facilitating more effective surface finishing so as to substantially inhibit the formation of corrosion at the interface of the first generally planar vertical member 52 and the second generally planar vertical member 54. As those skilled in the art will appreciate, such openings 56 provide adequate access to the abutting edge of the first generally planar vertical member 52 so as to insure enhanced coating of the surface thereof during such processes as chrome plating, powder coating, and/or painting.

Further, such construction allows the welds 58 which attach the first generally planar vertical member 52 to the second generally planar vertical member 54 to be hidden from view. When the rubber bumper 30 is slid over the second generally planar member 54, then the welds 58 cannot be seen.

The second generally planar vertical member 54 is attached to the first generally planar vertical member 52 via welds 58 formed within the openings 56. According to the preferred embodiment of the present invention, a weld 58 is formed within every other opening 56. It has been found that adequate attachment of the second generally planar vertical member 54 to the first generally planar vertical member 52 is achieved by such construction. Alternatively, various other configurations are contemplated, e.g., forming a weld within every other opening 56, within every third opening 56, within every fourth opening 56, etc. It is also contemplated that two or more welds may be formed within elongate openings 56, if desired.

It is understood that the exemplary grille and brush guard described herein and shown in the drawings represents only a presently preferred embodiment of the invention. Indeed, various modifications and additions may be made to such embodiment without departing from the spirit and scope of the invention. For example, various different cross-sectional configurations of the first and second generally planar vertical members are likewise suitable. For example, the thickness of the second generally planar vertical member may be increased to a point where the cross-sectional configuration thereof is square. Round, triangular, and various other geometric cross-sectional configurations of the second generally planar vertical member are likewise suitable for facilitating the attachment of a rubber bumper via the use of a complimentary track formed therein. Thus, these and other modifications and additions may be obvious to those skilled in the art and may be implemented to adapt the present invention for use in a variety of different applications.

What is claimed is:

1. A grille guard for an automobile to which a rubber bumper is easily attachable, said grille guard comprising:
   a.) at least one first grille guard member extending generally horizontally so as to protect a portion of the automobile's front;
   b.) at least one second grille guard member extending generally vertically and formed to said at least one first grille guard member, each of said second grille guard members comprising:
      i.) a first generally planar member oriented so as to define a plane which extends generally longitudinally with respect to the automobile;
      ii.) a second generally planar member oriented to define a plane which extends generally transversely with respect to the automobile, said second generally planar member comprising a plurality of openings formed therein, generally along the length thereof, said openings traversing the first generally planar member and having a width which is greater than a width of said first generally planar member;
      iii.) said second generally planar member being attached to said first generally planar member so as to define a generally T-shaped cross-section of said first and second generally planar members, said second generally planar member being attached to said first generally planar member by forming a plurality of welds between said second generally planar member and said first generally planar member within said plurality of openings, said welds attaching said second generally planar member to said first generally planar member in a manner which provides a generally flush finish to a front surface of said second generally planar member; and
      iv.) said opening formed in said second generally planar member reducing blind corners so as to enhance surface finishing of said second grille guard members and thus inhibiting corrosion thereof.

2. The grille guard as recited in claim 1, wherein said at least one first grille guard member comprises at least two first grille guard members.

3. The grille guard as recited in claim 1, wherein said at least one second grille guard member comprises two second grille guard members.

4. The grille guard as recited in claim 1, wherein:
   a) said first generally planar member comprises metal plate having a thickness of between 0.150 inch and 0.500 inch; and
   b) said second generally planar member comprises sheet metal having a thickness of between 0.025 inch and 0.250 inch.

5. The grille guard as recited in claim 1, wherein:
   a) said first generally planar member comprises metal plate having a thickness of 0.250 inch; and
   b) said second generally planar member comprises sheet metal having a thickness of 0.050 inch.

6. The grille guard as recited in claim 1, wherein said openings formed in said second generally planar member have a length of between 0.25 inch and 3.00 inch and a spacing between openings has a length of between 0.10 and 2.00 inch.

7. The grille guard as recited in claim 1, wherein said openings formed in said generally planar member have a length of 1.50 inch and spacing between openings has a length of approximately 0.25 inch.

8. The grille guard as recited in claim 1, wherein said openings formed in said second generally planar member have a width of between 0.20 inch and 0.75 inch.

9. The grille guard as recited in claim 1, wherein said openings formed in said second generally planar member have a width of 0.375 inch.

10. The grille guard as recited in claim 1, wherein said second generally planar member is attached to said first generally planar member via welds formed every other opening of said second generally planar member.

* * * * *